United States Patent [19]

Buessinger

[11] Patent Number: 5,146,663
[45] Date of Patent: Sep. 15, 1992

[54] REVOLVING HEAD FOR MACHINE-TOOL
[75] Inventor: Pierre Buessinger, Colmar, France
[73] Assignee: Somex Mulhouse S.A., France
[21] Appl. No.: 613,623
[22] PCT Filed: May 24, 1989
[86] PCT No.: PCT/FR89/00247
  § 371 Date: Nov. 21, 1990
  § 102(e) Date: Nov. 21, 1990
[87] PCT Pub. No.: WO89/11376
  PCT Pub. Date: Nov. 30, 1989
[30] Foreign Application Priority Data
  May 25, 1988 [FR] France ............... 88 07142
[51] Int. Cl.⁵ ............................................ B23B 39/20
[52] U.S. Cl. ........................................ 29/40; 408/35; 409/211; 74/826
[58] Field of Search ........... 29/40, 48.5 A; 409/211, 409/216, 218, 233; 408/35, 88; 74/813 L, 816, 826

[56] References Cited
U.S. PATENT DOCUMENTS
2,915,922 12/1959 Treer ........................... 74/822
2,956,454 10/1960 Hansen ....................... 408/35
3,717,417 2/1973 Aubrier ....................... 408/35
4,887,345 12/1989 Saito et al. .................. 29/40 X FOREIGN PATENT DOCUMENTS
2739087 3/1978 Fed. Rep. of Germany.
2080951 11/1971 France.
2243757 4/1975 France.
2526343 11/1983 France.
0047003 2/1988 Japan ........................... 408/35
1025019 4/1966 United Kingdom.

Primary Examiner—Z. R. Bilinsky
Attorney, Agent, or Firm—Davis, Bujold & Streck

[57] ABSTRACT

A revolving head for machine tool including one fixed frame, one spindle-bearer turret movable in rotation with respect to this frame, at least two tool bearer spindles fitted to the turret, rotation devices for the spindles and automatic driving devices to rotate the turret. The turret includes a first element secured to the frame and a second element movable with respect to the first element. The automatic driving devices includes an axial piston and a rotary piston to move respectively axially and in rotation the second element of the turret with respect to the first element.

10 Claims, 5 Drawing Sheets

REVOLVING HEAD FOR MACHINE-TOOL

The present invention concerns a revolving head for machine-tool including one fixed frame, one spindle-bearer turret movable in rotation with respect to this frame, at least two tool-bearer spindles fitted to said turred, rotation devices of said spindles and automatic driving devices to rotate said turret, in which the turret includes a first element secured to said frame and a second element movable with respect to first element and in which said automatic driving devices include an axial piston and a rotary piston to move respectively axially and in rotation said second element of turret with respect to said first element.

Already known are several types of revolving head, manually or automatically driven, which generally are not satisfactory on machining units of classical type or with numerical control, especially those which are described in the FR-A-2 080 951 french patent application and in the U.S. Pat. No. 2,915,922. It should be noticed that both systems are quite different from the present invention in their principle and in their construction.

As a matter of fact, in revolving heads of previous design, tools are fixed, so that machining requires driving of part to be machined. In design of invention, tools are in rotation and parts are fixed. Thus the known devices can not carry out works carried out by revolving head of invention and do not have same flexibility of use and same reliability.

The present invention palliates said disadvantages by offering a revolving head of above mentioned type, characterized by the fact that frame axis forms a 45° angle with turret axis.

According to a preferred embodiment, the axial piston has a rod integral with the turret first element and said fixed frame, and a cap integral with said turred second element and displaceable axially and in rotation with respect to said rod.

According to this preferred embodiment, the revolving head as per invention has a compression spring fitted between the piston basis and the turret second element, this spring being designed to bring said second element back against the first element of the turret after a relative axial displacement of both elements.

The spring is preferably, fitted partly in a first ring-shaped cavity made at the piston basis and partly in a second ring-shaped cavity made in the turret said second element, both these cavities being located co-axially with respect to said rod, one in prolongation of the other.

It is advantageously made of a stacking of Belleville washers.

According to a particularly advantageous construction, the rotary piston is fitted to the rod tip and is moused inside a cylinder chamber.

The axial piston can have at least one hollow, the turret of said second element having at lest one pin designed to take place into said hollow, and these devices being designed to make integral said axial piston, itself secured to the rod, with turret said second element when turret is axially displaced with respect to said first element.

Driving devices of spindles include preferably a driving gear secured to a driving shaft, this gear having a cylindrical piece and a trunk-conical piece, and a driving gear secured to a driving shaft of a spindle which is always engaged at least with the trunk-conical piece of the driving gear of the driving shaft.

Under this shape of construction, the generating lines of said trunk-conical piece form with the gear axis a 45° angle, and are parallel to the rod axis.

The trunk-conical and cylindrical pieces of driving gear are advantageously pressed one against the other by a spring to be coupled. This spring is preferably made of a stacking of Belleville washers.

According to another advantageous construction, revolving head has a multicontactor housed in a cavity made in the frame, this multicontactor being designed to control electrical functions of this head, and at least two operating rods corresponding respectively to said tool-bearer spindles, and connected to operating pins corresponding respectively to each spindle and designed to actuate said multicontactor through said operating rods.

The present invention will be better understood by description of one construction example and by attached drawing, in which.

Figure 1:
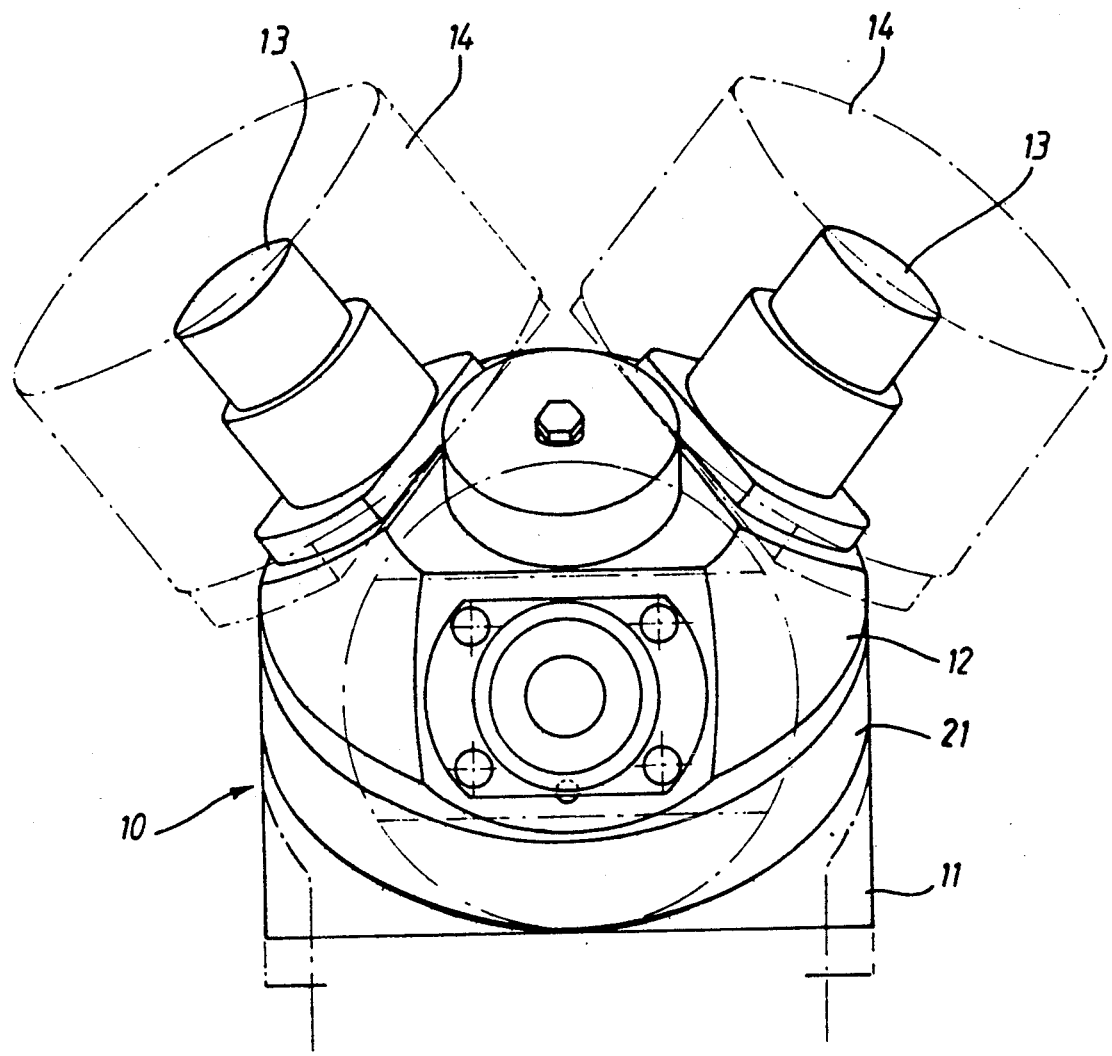
FIG. 1 shows an outlook view of one preferred shape of construction of patented revolving head.

Refering to FIG. 1 the revolving head for machine-tool 10 has one fixed frame 11 to which is fitted a spindle-bearer turret 12 which, as its name indicates, bears for example three tool-bearer spindles 13 placed at 120° one to the other. Spindles 13 could be replaced by adaptations 14 of multispindle type already known. It is obvious that number of spindles or of multispindle adaptations is of course not limited to three, though this construction can be advantageous in some cases for reasons of the room occupied.

Figure 2:
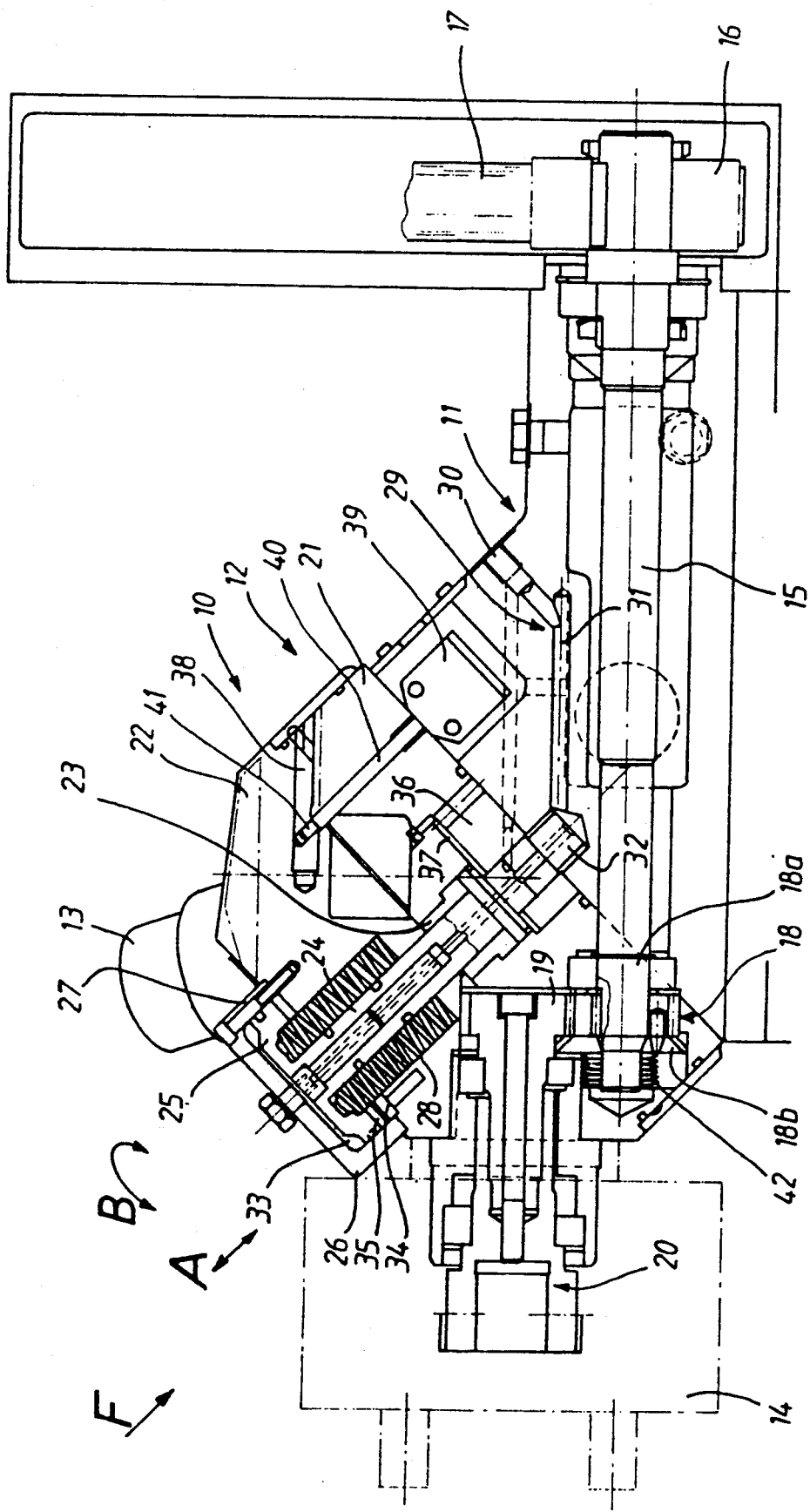
FIG. 2 shows an axial view of revolving head represented by FIG. 1.

FIG. 2 shows a detailed section view of revolving head 10. The fixed frame 11, 90° elbow shaped, includes essentially driving shaft 15 having at its tip the most distant from the turret a wheel or an driving gear 16 over which passes a belt 17, and at its other tip a driving gear 18 which can mesh with a driving gear 19 secured to the tool-bearer head 20 of spindle 13.

Turret 12 is arranged with regard to frame 11 so that its axis makes with driving shaft axis an angle of 45°.

With this especially advantageously arrangement, spindle or multispindles have an optimal clearance with respect to this one which is in machining position and which is parallel to driving shaft.

Moreover, machining strengths are ideally absorbed, which is not the case for other known spindles which withstand a reversing torque when they are in machining position.

The turret 12 can be displaced with respect to fixed frame 11 as per an axial motion illustrated by the double arrow A and as per a rotary motion illustrated by the double arrow B. To this end, turret includes two elements respectively 21 and 22, the first one 21 being secured to fixed frame, the second 22, cap shaped and partly interlocking with said first element. First element 21, which is rigidly fitted to fixed frame 11, has a casing or bushing 23 inside which can turn around its axis a cylindrical rod 24 at the upper tip of which is fixed an axial piston 25, the role of which will be explained later.

Piston 25 is housed in a chamber made inside a cap 26 ring shaped which is fixed to second element 22 of turret by means of screws or bolts 27.

A compression spring 28, preferably made of a stacking of Belleville washers, is partly housed in a first ring shaped cavity made at piston 25 basis, coaxial with respect to rod 24 and partly in a second ring shaped cavity in prolongation of previous one and made in second element 22 of turret coaxially with respect to this same rod 24.

The fixed frame 11 is equipped with a pipe 29 including an opening 30 and a linear opening 31 which opens in an axial pipe 32 extending through rod 24 and piston 25 to open into a pressure chamber 33 made between piston 25 and inner surface of cap 26.

When one injects a fluid under pressure into opening 30, pressure of hydraulic fluid which is transmitted through openings 31 and 32 appear in chamber 33, which displaces cap 26 with respect to piston 25. As cap 26 is secured to turret second element 22 through bolts 27, this second element rises with respect to first element 21 by compressing spring 28 owing to the crushing of Belleville whashers it is made of. Turret second element 22 is on the other hand equipped with at least one pin or one bolt 34 the head of which enters into a cavity 35 made at basis of axial piston 25 and which has the purpose to make temporarily integral said second element of turret with said piston. In this position, piston can be used to move turret in rotation as per a motion which will be fully explained hereunder.

Rod 24, which is secured to piston 25, has at its lower tip a rotary piston 36 housed inside the ring shaped chamber 37 made in the turret first element 21. This rotary piston can, as shown on FIG 3, be brought in thrust in two different positions respectively 36 a and 36 b, according as hydraulic fluid is injected to one side or to the other side of this rotary piston into chamber 37. As the rotary piston is secured to piston 25 through rod 24, and that piston 25 is temporarily made integral, by at least one pin 34, with turret second element 22, this turret can be 120° turned to change spindles. When pressure is released in pressure chamber 33, cap 26 comes back to its initial position, pushed by spring 28, which disengages head of pin or of pins 34 from corresponding cavity 35 and disconnects piston 25 from turret second element 22. By an appropriate injection of fluid under pressure, one brings back rotary piston 36 to its initial position, which makes it ready for a new working cycle to 120° turn the turret, or more correctly the turret second part 22 (in case turret has three tool-bearer spindles) with respect to first part 21 of this turret or of fixed frame.

The driving gear 18 of spindles driving devices includes a first cylindrical piece 18a and a second trunk conical piece 18b placed at front tip of this device under a normal functioning, the cylindrical piece is in mesh with driven gear 19. When one raises turret, that means when one displaces as above described, the second part 22 axially with respect to the first part 21 of this turret, gear 19 remains in mesh with gear 18 owing to the existence of trunk-conical piece 18b, the angle of which is 45°. This shape of construction ensures an accurate indexing of driving gears. To this end, the trunk-conical piece 18b is pushed against the cylindrical piece 18a through a compression spring 42 made with stacked Belleville washers I. Spring has the purpose to absorb the temporary constraints which can be exerted to the teeth if, at the time of a spindle change, teeth of gear 19 come facing teeth of gear 18 and thus to avoid a jamming of drive or even a damage to gears.

Figure 3:
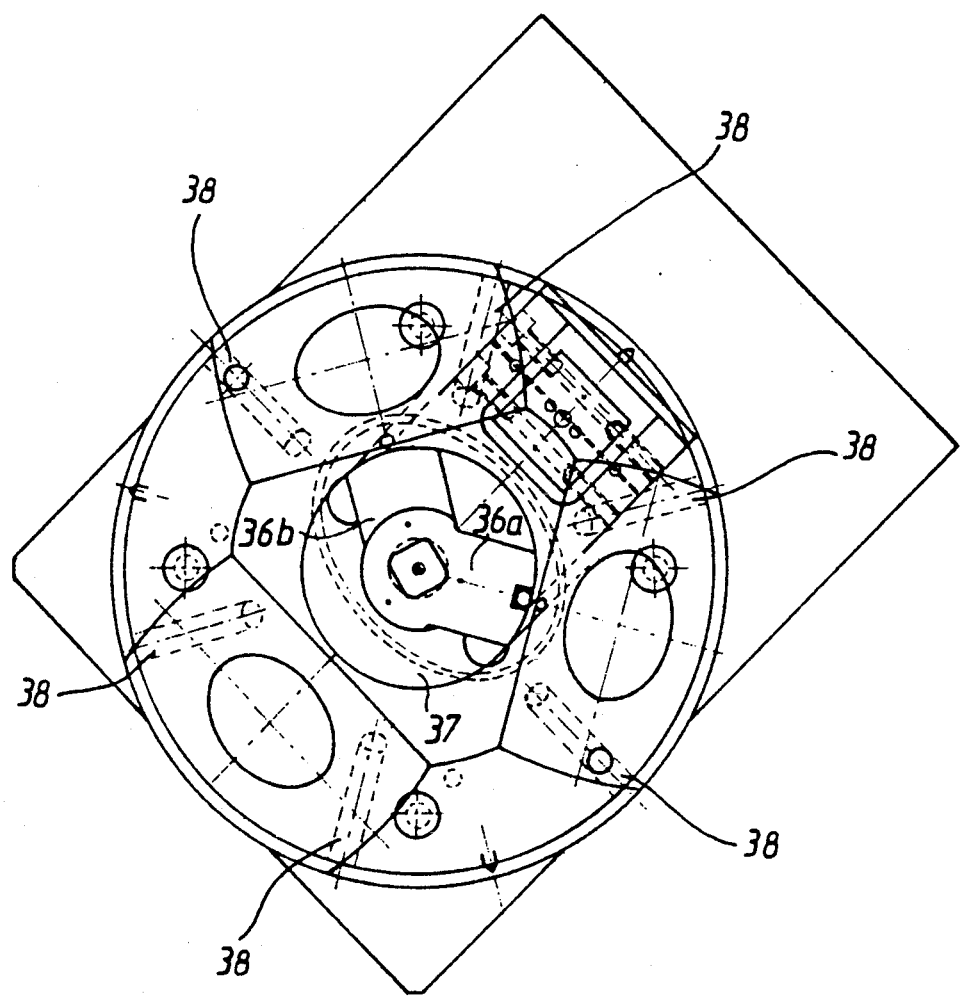
FIG. 3 shows patented revolving head, partly cut and viewed from the direction of arrow F.

Referring to FIG. 3, indexing pins 38, situated between two corresponding surfaces of first and second element of turret, are used to index accurately this second element 22 with regard to first element of this turret. In case of a turret bearing three spindles, they are six pins and they are 60° staggered. These pins could be replaced by relief parts of one of the elements meshing with complementary hollows of the other element.

A multicontactor 39 ensures electrical controls of the device. This multicontactor is housed in a cavity made in the frame. It is connected to at least two driving rods 40 corresponding respectively to said tool-bearer spindles, each of which having for instance a driving pin 41 to actuate the driving rods in order to operate one of the contactors of the multicontactor.

Figure 4:
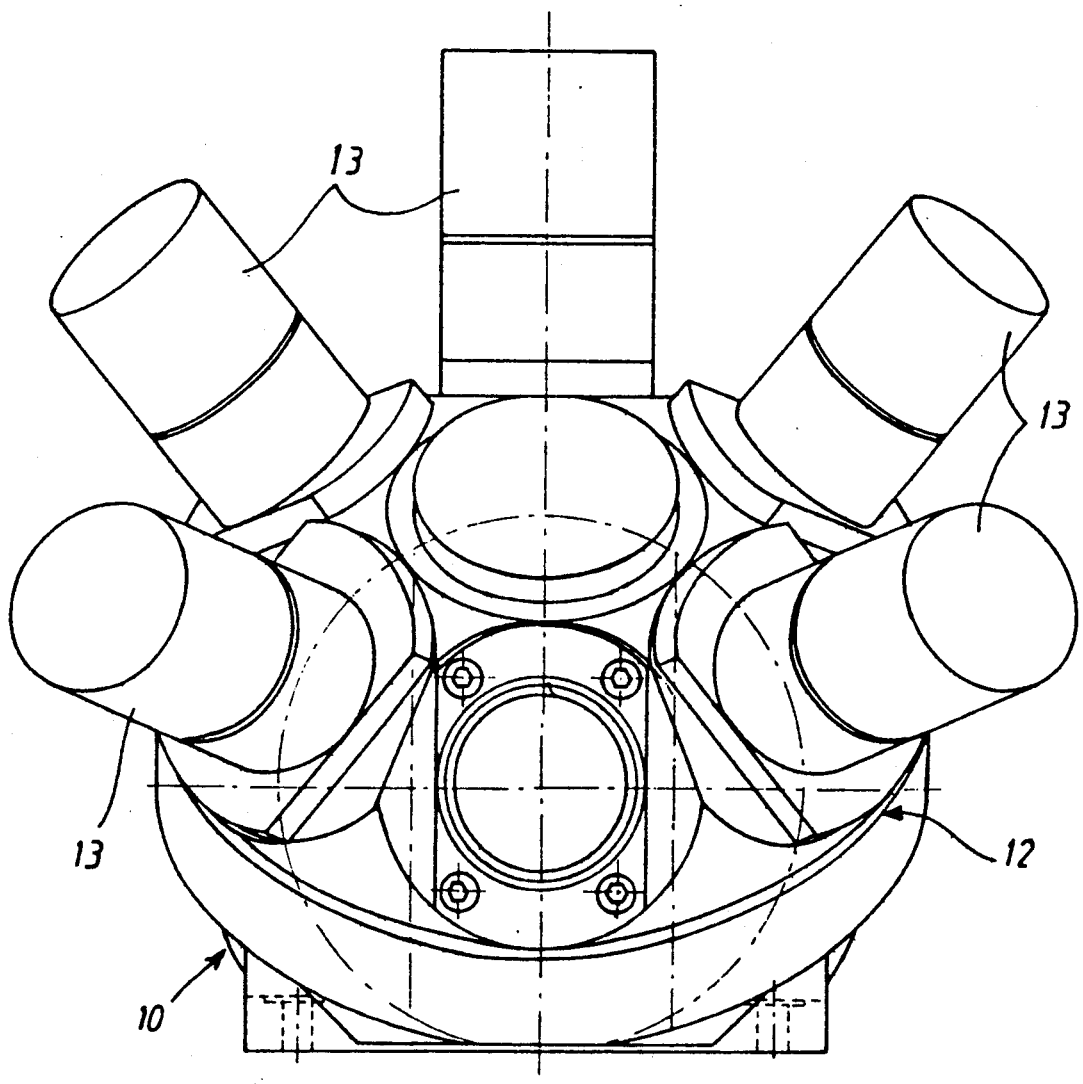
FIG. 4 shows an outlook view of one shape of construction where turret has six tool-bearer spindles.
Figure 5:
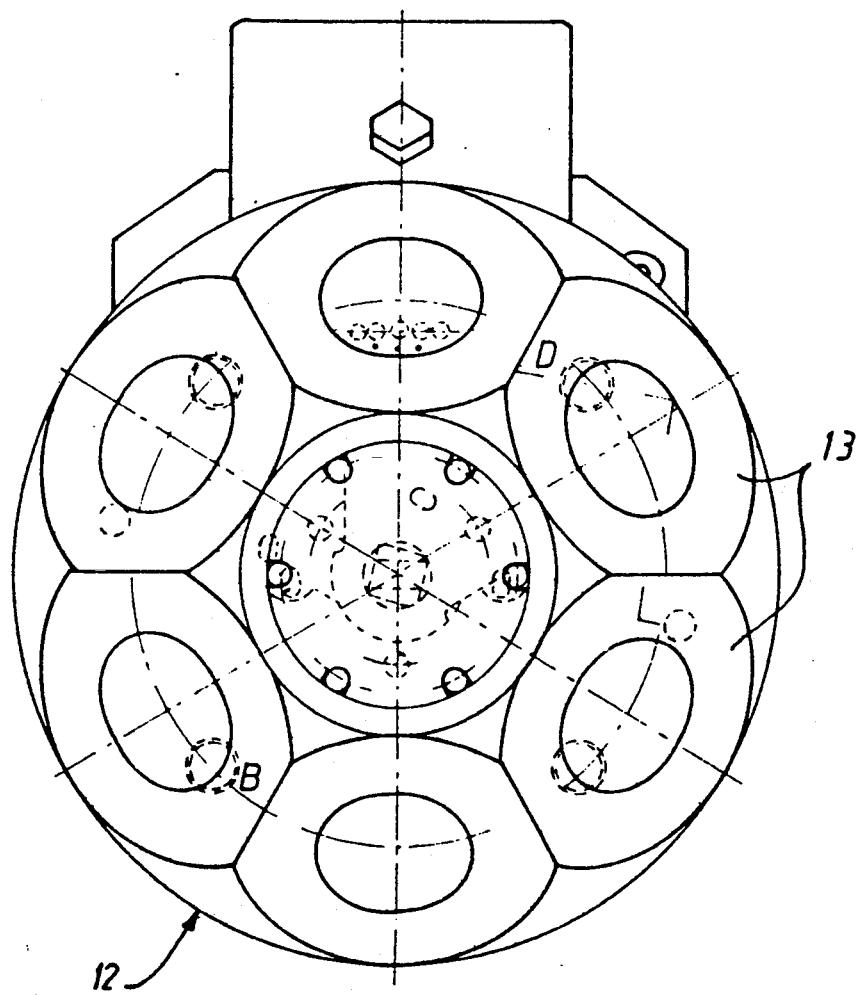
FIG. 5 shows a bottom view of revolving head illustrated by FIG. 4.

FIG. 4 5, illustrate an other arrangement in which turret 12 of revolving head 10 has six tool-bearer spindles 13 which are fitted one at 60° to the other. As previously these spindles could be replaced by multi-spindles adaptation elements.

This construction is based on the same principles as those which are carried out for revolving head as per previous figures. The head rotating angle to go from one spindle to an other is 60°. Using six spindles increases machine flexibility and its possibilities. The driving technique of spindles remains the same as that previously described.

Among original devices and advantages of present invention, one can notice:

the especially efficient principle of a synchronisation system obtained by combination of both parts of driving gear 18 coupled by a compression spring, the presence, in the frame, of the multicontactor housed in an insulated box and the contacts of which are actuated by rods and driving washers, the simplicity of an eventual replacement of multicontacter 39 which does not require any setting on the machine; this device can be preset originally.

the use of pins to index the turret which authorizes very strong radial oscillations during use of spindles the indexed position of the turret ensured mechanically by Belleville washes, which avoid any risk in case of accidental drop of hydraulic pressure the extreme simplicity of hydraulic circuit which includes one axial piston and one rotary piston only and requires a very low capacity small hydraulic station only.

This circuit ensures, with 1.5 second, the raising of turret to un-index the pins 38, to engage piston 25 into the pin 34 and disengage gear 19, which ensures 60° or 120° turret rotation. The drop of hydraulic pressure through the Belleville whashers re-indexes the pins 38, un-indexes the piston 25 and the rotary piston 36 can take again its initial position.

All mechanical parts in motion are in oil both and the head can plant itself either vertically or horizontally.

Present invention is not limited to described shapes of construction, but can cover other arrangements, obvious to the specialist.

I claim:

1. A revolving head for machine tools comprising a fixed frame, a spindle-bearer turret rotatable relative to said frame, at least two tool-supporting spindles attached to said turret, drive means for rotating a desired one of said spindles comprising a drive shaft (15), wherein a first element is fixed to said frame and said turret comprises a second element which is axially and rotatably movable with respect to said first element and which is indexed with respect to said first element by means of protruding portions carried by one of said first and second elements engaging with complementary recesses carried by the other of said first and second elements, automatic control means comprising an axial piston (25) which displaces said second element (22) axially with respect to the said first element (21), a rotary piston (36) which rotates said second element (22) relative to said first element (21), and the axis of said drive shaft (15) forms a 45° angle with an axis of said turret (12), characterized in that said axial piston comprises a rod (24) rotatably mounted to said first element (21) and to the fixed frame (11), and a cap (26) secured to said second element (22) and axially and rotatably movable with respect to said rod, and compression spring means (28) attached between a base of said axial piston (25) and said second element (22) for biasing said second element (22) into contact with the said first element (21) after relative axial displacement of said first and second elements.

2. A revolving head according to claim 1, wherein said compression spring means (28) is partially secured within a first annular cavity formed in the base of said axial piston (25) and partially secured within a second annular cavity formed in said second element (22), said two annular cavities being coaxially disposed in relation to said rod (24) and each other.

3. A revolving head according to claim 2, wherein said compression spring means (28) comprises a stack of Belleville washers.

4. A revolving head according to claim 1, wherein said rotary piston (36) is attached to an end of the rod (24) opposite said axial piston (25) and is housed inside a cylindrical chamber (37) of said first element (21).

5. A revolving head according to claim 1, wherein said axial piston (25) has at least one opening (35) and said second element (22) has at least one pin (34) for engaging said at least one opening (35), said pin and opening serving to connect said axial piston (25), connected to the rod (24), to said second element (22) when said second element is axially displaced in relation to the said first element (21).

6. A revolving head according to claim 1, wherein said drive means comprises a drive gear (18) secured to a drive shaft (15), said drive gear consists of a cylindrical portion (18a) and a truncated portion (18b), and a drive gear (19) secured to a spindle drive shaft (20) which is engaged with at least the truncated portion of the drive gear of the drive shaft.

7. A revolving head according to claim 6, wherein generatrices of said truncated portion (18b) form a 45° angle with an axis of said driven gear.

8. A revolving head according to claim 6, wherein said truncated portion (18b) and said cylindrical portion (18a) of the drive gear are placed in contact with each other by means of a spring device (42).

9. A revolving head according to claim 8, wherein said spring device (42) comprises a stack of Belleville washers.

10. A revolving head according to claim 1, wherein said revolving head comprises a multicontactor (39) housed within a cavity supported by said frame, said multicontactor controls the electrical functions of said revolving head and has at least two drive rods (40) corresponding to the at least two tool-supporting spindles and associated with drive pins (41) corresponding to each of the spindles, respectively.

* * * * *

UNITED STATES PATENT AND TRADEMARK OFFICE
CERTIFICATE OF CORRECTION

PATENT NO. : 5,146,663
DATED : September 15, 1992
INVENTOR(S) : Pierre BUESSINGER It is certified that error appears in the above-identified patent and that said Letters Patent is hereby corrected as shown below:

Column 4, line 64 change "spindle-bearer" to --spindle-bearing--.

Signed and Sealed this

Fifteenth Day of February, 1994

*Attest:*

BRUCE LEHMAN

*Attesting Officer*          *Commissioner of Patents and Trademarks*